Figure 1:
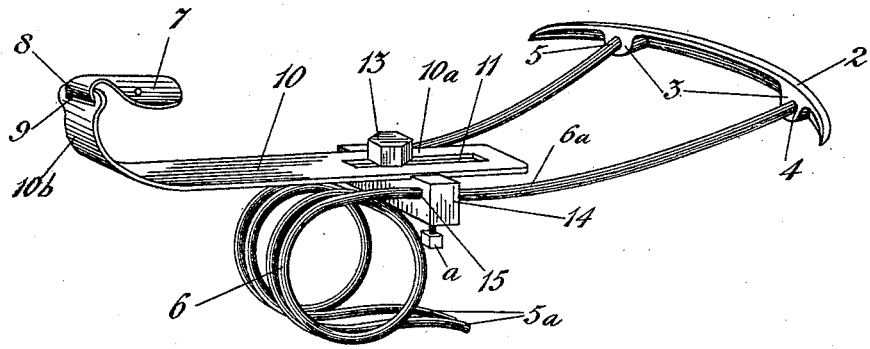

(No Model.)

H. CUTLER.
SADDLE FOR VELOCIPEDES.

No. 499,718. Patented June 20, 1893.

Witnesses,
L. Shoulds
M. E. Lindop

Inventor,
Henry Cutler
by C H Riches
his atty

UNITED STATES PATENT OFFICE.

HENRY CUTLER, OF TORONTO, CANADA.

SADDLE FOR VELOCIPEDES.

SPECIFICATION forming part of Letters Patent No. 499,718, dated June 20, 1893.

Application filed January 3, 1893. Serial No. 457,118. (No model.)

*To all whom it may concern:*

Be it known that I, HENRY CUTLER, manufacturer, of the city of Toronto, in the county of York and Province of Ontario, Canada, have invented certain new and useful Improvements in Saddles for Velocipedes; and I hereby declare the following to be a full, clear, and exact description of the same.

Many saddles in present use have coiled or twisted springs which impart a hammock motion to the saddle and cause distress to the rider; and the object of this invention is to construct an easy and comfortable saddle in which will be combined lightness and strength; and the use of which will overcome the jar or vibration caused the machine when traversing over a rough or uneven surface; and the invention consists essentially of the saddle hereinafter more fully set forth in the specification, illustrated in the drawings, and more particularly pointed out in the claim.

Figure 2:
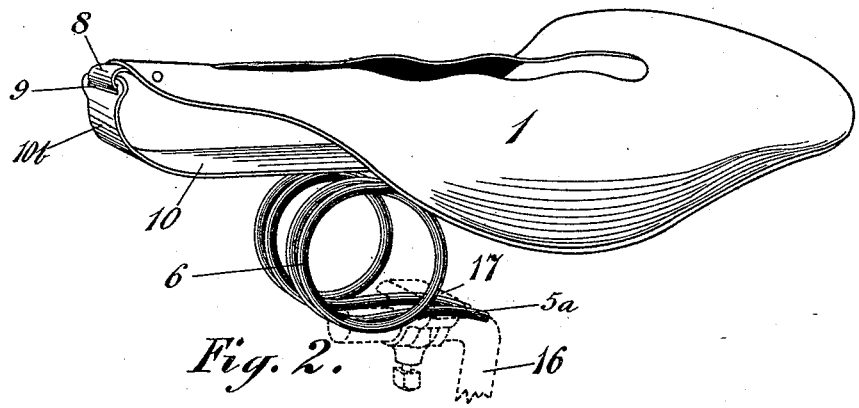
Figure 3:
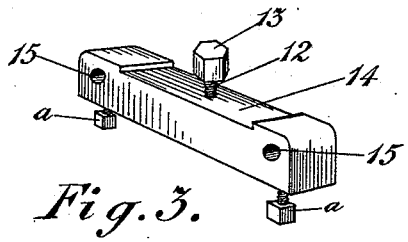

In the drawings:—Figure 1 is a perspective view of the saddle showing the arrangement and formation of the various parts. Fig. 2 is a perspective view of the same. Fig. 3 is a perspective view of the coupling bracket securing together the springs.

Like numerals of reference refer to like parts throughout the specification and drawings.

The saddle consists of a seat 1 the rear end of which is riveted or otherwise secured to the top of a curved plate 2. This plate 2 has formed on its inner side two collars 3, arranged equi-distant from each other and from the ends of the plate. Formed in each of the collars 3 is a hole or recess 4 and into each of these holes or recesses enter the upper rear ends 5, of each of the saddle springs 6, respectively. The front of the seat 1 is riveted or otherwise secured to a plate 7 having formed at its front end a hooked projection 8 which is hooked into an eye 9 formed in the upper front end $10^b$ of the flat bracket spring 10.

It will be noticed by reference to the drawings that the seat 1 is what might be termed pear shaped which is found to be the most comfortable form of seat yet devised.

The flat supporting spring 10 is in the form of an L and the longer arm $10^a$ of the L is in a horizontal plane and extends rearwardly beyond the middle of the seat. Formed in the longer arm $10^a$ of the supporting spring 10 is a slot 11 through which passes a set screw 12 having a hexagonal shaped head 13. The head 13 bears upon the metal on either side of the slot 11 and the threaded portion of the set screw 12 enters the threaded aperture in the coupling bracket 14 located on the under side of the said flat supporting spring 10.

The coupling bracket 14 consists of a bar of metal of sufficient length to project beyond each edge of the flat supporting spring 10. Formed through the supporting bracket 14 are two holes or openings 15 arranged one at or near either end of the said coupling bracket 14. Passing through the holes 15 is the stem $6^a$ of the spring 6 and this spring it might be stated is slightly curved from the coupling bracket 14 to the collar 3. Each of the springs 6 on the front side of the coupling bracket 14 is coiled one and one-half times to form the coils and to bring the ends $5^a$ to the rear of the coupling bracket 14. It might here be stated that passing through the coupling bracket 14 from its under side are two set screws *a* arranged one opposite each of the springs 6 in order that the pressure of the said set screws *a* will bind the spring 6 to the said coupling bracket.

The ends $5^a$ are secured to the saddle pillar 16 by means of a clasp 17 which clasp may be of any ordinary construction suitable for the purpose. By the use of the coupling bracket 14 and the slot 11 in the flat spring 10 the flat spring can be moved longitudinally and the seat 1, can be tightened to any ordinary degree of rigidity. The coiled or circular portion of the spring 6 is so constructed that the tension is distributed evenly throughout its entire length and prevents not only all abrupt and jerky motion but enables the spring without breakage to sustain the weight of the heaviest rider while traveling over the roughest kind of road. This is the essential object of the invention and is a vast improvement on the old style of curved or semi-circular spring in which the entire strain occurs on one part and which combined with the constant vibration causes a crystallization of the steel at that point with the almost certain result that breakage will occur.

This saddle is so constructed as to obviate all motion which would cause distress to the rider and by its peculiar construction the weight of the rider is thrown principally in the rear of the springs which causes the saddle a downward and rearward motion when meeting an obstruction or when traversing over an uneven surface. By the peculiar formation of the coil the strain is equalized throughout the spring and all danger of crystallization is avoided.

It might also here be stated that the spring by responding to a downward and rearward movement causes the spring to reinforce itself and thus provide an automatic adjustment to the weight of the rider. This automatic adjustment confers a degree of ease and comfort which it has never been possible hitherto to accomplish. The ends $5^a$ of the springs which are fitted into the clasp 17 being curved admit of the saddle being adjusted to any angle the rider may desire. This is also a feature of great advantage as the rider can so adjust the inclination of the saddle as to accommodate itself to his own weight in order that his own weight when placed upon it will bring it to a horizontal position. As before stated when the machine meets with an obstacle the motion of the saddle is downward and rearward and this motion it might be stated is so gentle and gradual that it is unnoticeable with the result that the rider is in no wise punished or distressed by the same. After the seat has been depressed in this manner it reassumes its normal position gradually and gently. The ends of the spring are fitted into the rear bracket in such a manner, as to uphold the rear end of the saddle to enable the rider to maintain his balance, and, to entirely prevent the sagging to one side so common in saddles now in use wherein the spring is fastened to the rear bracket in the middle only. The springs are so formed as to permit the seat to be suspended in closer relation to the frame of the machine and by its peculiar construction the seat can be carried lower than is possible with other saddles an advantage which many riders appreciate. The coiled spring it might also be stated is of the greatest flexibility and readily answers when the machine is caused to vibrate.

Having thus fully described my invention, what I claim as new, and desire to secure by Letters Patent, is—

In a saddle for velocipedes the combination of the seat, a seat plate 2 secured to the rear and under side of the seat, a coiled spring 6 having rearward extensions respectively $6^a$ and $5^a$, the seat plate 2 having sockets to receive the rearward extensions $6^a$ and a coupling bracket secured to the rearward extensions $6^a$ between the coiled portion of the spring and the seat plate 2, set screws $a$ for securing the coupling bracket to the extensions, a flat L-shaped spring 10 secured to the coupling bracket by means of a set screw 13 said L-shaped spring having a slot 11 formed therein through which passes the said set screw and a slot formed in its vertically disposed front end, a hooked plate 7 to hook into the slot in the vertically disposed end of the said spring and means for securing the extensions $5^a$ to the saddle pillar, substantially as set forth.

Toronto, November 19, 1892.

HENRY CUTLER.

In presence of—
CHARLES H. RICHES,
WM. SMALLWOOD.